(12) United States Patent
Patterson

(10) Patent No.: US 8,117,812 B2
(45) Date of Patent: Feb. 21, 2012

(54) HEADER TRANSPORT

(75) Inventor: Roger L. Patterson, Duncan (CA)

(73) Assignee: MacDon Industries Ltd., Winnipeg, Manitoba (CA)

( * ) Notice: Subject to any disclaimer, the term of this patent is extended or adjusted under 35 U.S.C. 154(b) by 110 days.

(21) Appl. No.: 12/047,047

(22) Filed: Mar. 12, 2008

(65) Prior Publication Data

US 2009/0056296 A1     Mar. 5, 2009

Related U.S. Application Data

(60) Provisional application No. 60/968,334, filed on Aug. 28, 2007.

(51) Int. Cl.
*A01B 73/00* (2006.01)
(52) U.S. Cl. .......................................................... 56/228
(58) Field of Classification Search ................ 56/14.7, 56/14.9, 15.3, 15.6, 16.3, 228, DIG. 9; 172/270, 172/386, 671
See application file for complete search history.

(56) References Cited

U.S. PATENT DOCUMENTS

| | | | | | |
|---|---|---|---|---|---|
| 943,090 | A | * | 12/1909 | MacPhail ........................... | 56/228 |
| 2,766,053 | A | * | 10/1956 | Madruga ....................... | 280/414.1 |
| 2,955,848 | A | * | 10/1960 | Hyland et al. ..................... | 172/314 |
| 3,245,695 | A | * | 4/1966 | Bernard ............................ | 280/400 |
| 3,279,158 | A | * | 10/1966 | Kirkpatrick et al. ............... | 56/228 |
| 3,413,014 | A | * | 11/1968 | Franz .............................. | 280/400 |
| 3,515,408 | A | * | 6/1970 | Cagle ............................... | 172/240 |
| 3,525,537 | A | * | 8/1970 | Honnold ........................... | 172/625 |
| 3,771,297 | A | * | 11/1973 | Jackson ............................ | 56/15.2 |
| 4,026,365 | A | * | 5/1977 | Andersson et al. ............... | 172/386 |
| 4,371,299 | A | * | 2/1983 | Cain et al. ........................ | 410/44 |
| 4,385,483 | A | * | 5/1983 | McIlwain .......................... | 56/228 |
| 4,418,933 | A | * | 12/1983 | Wilcox, Jr. ....................... | 280/400 |
| 4,446,926 | A | * | 5/1984 | Hoaglen .......................... | 172/240 |
| 4,552,375 | A | * | 11/1985 | Kinzenbaw ...................... | 172/248 |
| 4,596,290 | A | * | 6/1986 | Bedney ............................ | 172/311 |
| 4,658,572 | A | * | 4/1987 | Honey et al. ..................... | 56/228 |
| 4,662,162 | A | * | 5/1987 | Bettencourt et al. ............ | 56/327.1 |
| 4,768,334 | A | * | 9/1988 | Honey et al. ..................... | 56/228 |
| 4,790,085 | A | * | 12/1988 | Rossman ......................... | 37/231 |
| 4,834,598 | A | * | 5/1989 | Bruns ............................... | 410/2 |

(Continued)

FOREIGN PATENT DOCUMENTS

CA          2505458         9/2008

*Primary Examiner* — Thomas Will
*Assistant Examiner* — Mai Nguyen
(74) *Attorney, Agent, or Firm* — Adrian D. Battison; Ade & Company Inc.

(57) ABSTRACT

A swather tractor has ground drive wheels at a first end, castor wheels at a second end and a header lift arms at the first end and can be driven with the first end forward for harvesting and with the first end rearward for towing. A transport for the header includes a longitudinal beam with a plurality of transverse support arms along the beam. The beam is kinked adjacent the front so that a main portion of the beam is offset to one side relative to the hitch assembly and the rear wheels. A yoke engages the lift arms and provides a hitch for towing the header. Either the forward end of the beam is directly attached to the hitch for small headers or for larger headers a steerable front wheel assembly is connected to the hitch and includes a spring coupling which transfers load to the lift arms.

12 Claims, 8 Drawing Sheets

U.S. PATENT DOCUMENTS

| | | | |
|---|---|---|---|
| 5,040,825 A * | 8/1991 | Kuhns | 280/789 |
| 5,056,806 A * | 10/1991 | Johnson | 280/143 |
| 5,113,956 A * | 5/1992 | Friesen et al. | 172/311 |
| 5,154,240 A * | 10/1992 | Carrick | 172/311 |
| 5,291,954 A * | 3/1994 | Kirwan | 172/311 |
| 5,361,569 A * | 11/1994 | Schupman et al. | 56/228 |
| 5,374,082 A * | 12/1994 | Smith | 280/789 |
| 5,529,447 A * | 6/1996 | Bruns et al. | 410/2 |
| 5,785,472 A * | 7/1998 | Smith et al. | 410/77 |
| 6,050,586 A * | 4/2000 | Wilson | 280/475 |
| 6,212,866 B1 * | 4/2001 | Rowse et al. | 56/384 |
| 6,321,852 B1 * | 11/2001 | Pratt | 172/452 |
| 6,419,431 B1 * | 7/2002 | Kuhns | 410/2 |
| 6,428,047 B1 * | 8/2002 | Kaderabek | 280/789 |
| 6,663,134 B2 * | 12/2003 | Paluch et al. | 280/491.2 |
| 6,675,568 B2 | 1/2004 | Patterson | |
| 7,159,687 B2 | 1/2007 | Dunn et al. | |
| 7,347,277 B2 * | 3/2008 | Enns et al. | 172/311 |
| 7,469,648 B2 * | 12/2008 | Bettin | 111/52 |
| 2005/0087350 A1 * | 4/2005 | Bauer | 172/311 |
| 2005/0121878 A1 * | 6/2005 | Muldoon | 280/426 |
| 2006/0201122 A1 * | 9/2006 | Bishop | 56/15.6 |
| 2006/0201732 A1 * | 9/2006 | Dunn et al. | 180/331 |

* cited by examiner

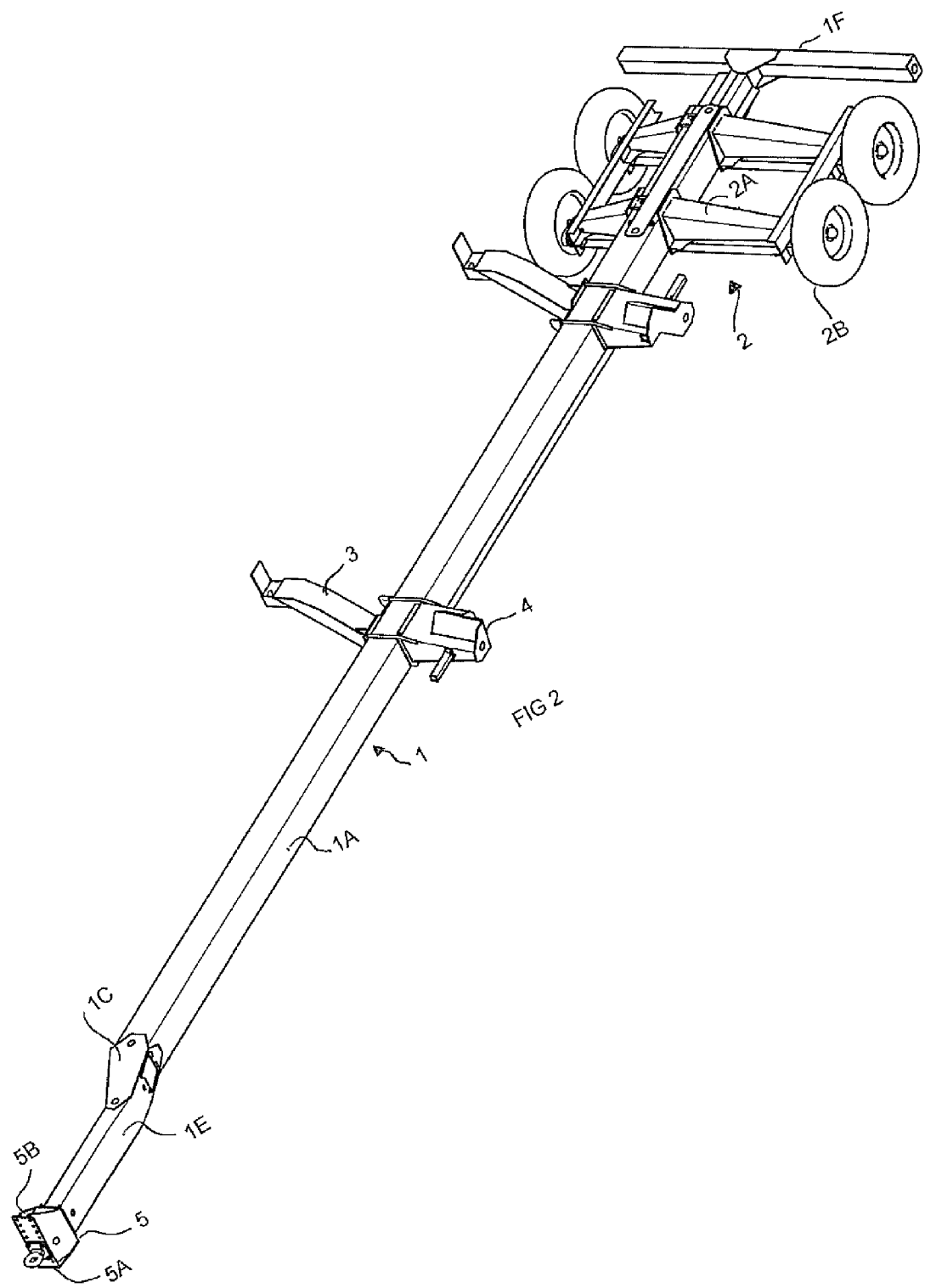

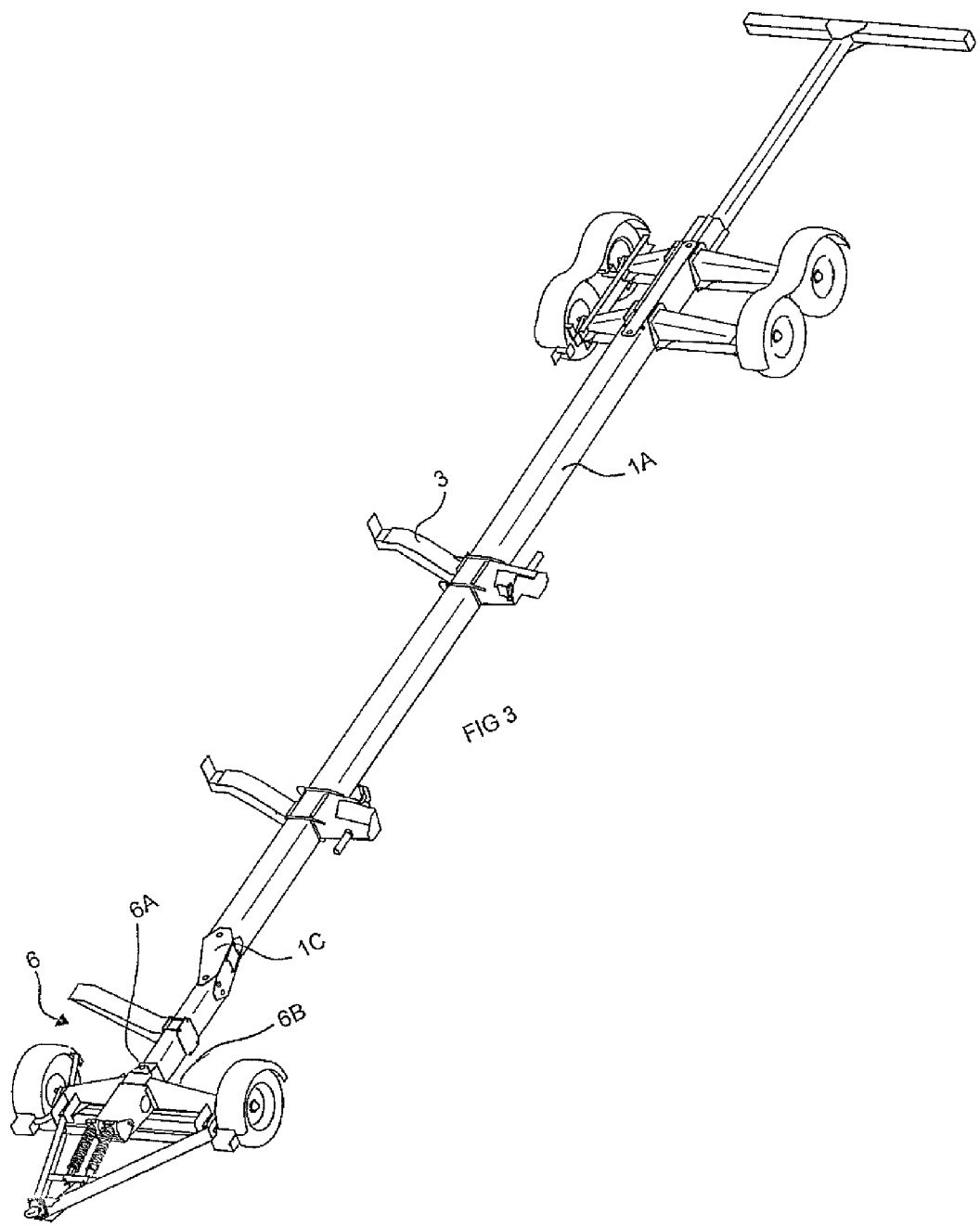

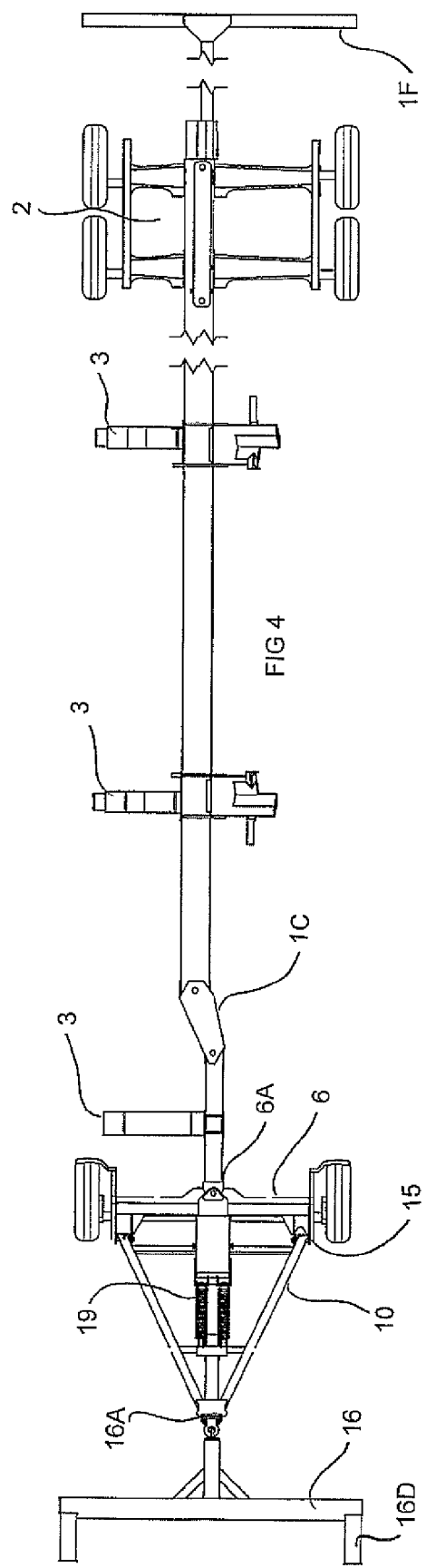

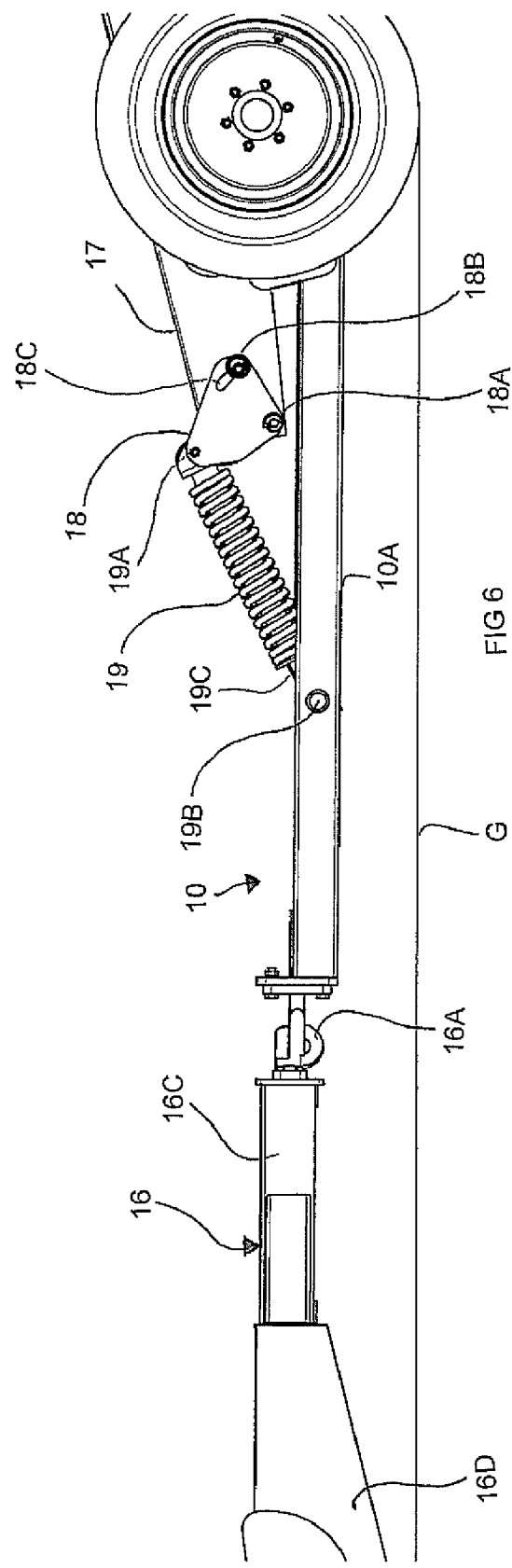

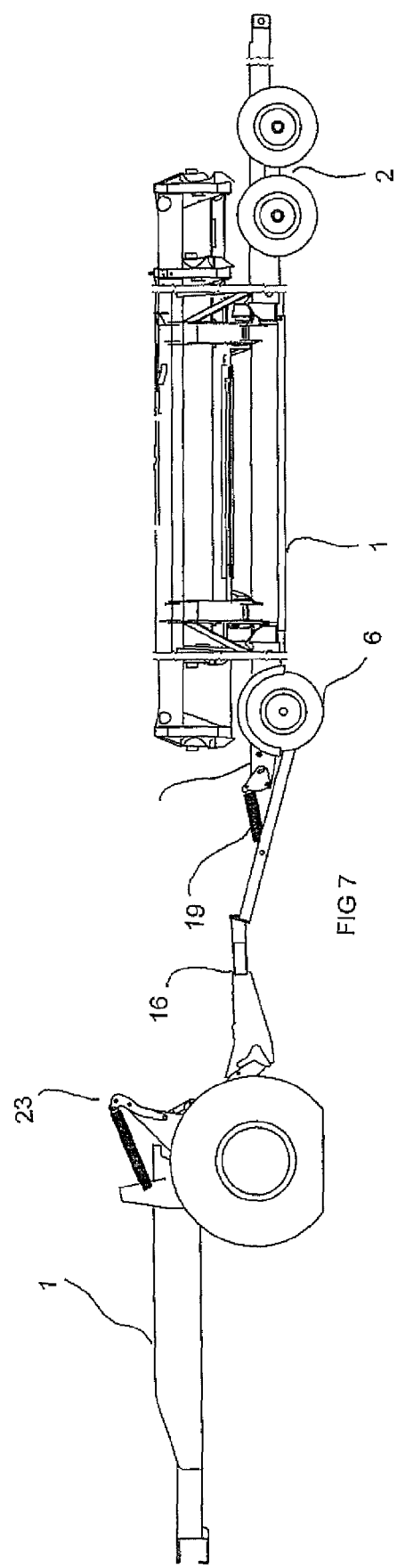

HEADER TRANSPORT

This application claims the benefit under 35 U.S.C. 119 of Provisional Application 60/968,334 filed Aug. 28, 2007.

This application relates to an apparatus for transporting a header of a crop harvesting machine.

BACKGROUND OF THE INVENTION

In U.S. Pat. No. 7,159,687 issued 1 Sep. 2007 based on an application filed Apr. 28, 2005, and Canadian application Serial No: 2,505,458, filed Apr. 27, 2005 entitled TRACTOR WITH REVERSIBLE OPERATOR POSITION FOR OPERATION AND TRANSPORT is disclosed a swather tractor for transporting a header of the type with which the present invention is concerned. The tractor has a frame, a pair of hydraulically driven ground drive wheels at a first end of the frame, a pair of castor wheels at a second end of the frame and a pair of header lift arms at the first end of the frame and is arranged such that it can be driven with the first end forward and for harvesting and with the first end rearward for towing.

In U.S. Pat. No. 6,675,568 (Patterson) issued Jan. 13, 2004 to the present Assignees is disclosed a crop harvesting header for mounting on a propulsion vehicle such as a swather tractor or combine harvester which includes a main frame structure supporting a crop receiving table with a cutter bar across a front of the table and side drapers on the table for moving the cut crop toward a discharge location of the header. The frame is divided into a central frame portion and two separate wing frame portions each arranged for pivotal movement relative to the central portion about a pivot axis extending in a plane parallel to the forward direction and intersecting the cutter bar so that, as the wing frame portions pivot, the cutter bar flexes in the area adjacent the respective pivot axis over a small angle of the order of 4 degrees to maintain the cutter bar following the ground. The central frame portion is mounted on two spring arms for upward and twisting floating movement such that the total downward force on the ground, from that part of the weight of all of the portions of the header which is unsupported, can be varied by moving the support to change the total pressure of the header on the ground. The wing frame portions are connected to the central frame portion by interconnecting linkages which transfer weight from the wing frame portions to the springs of the central portion each including a respective balance beam arranged to balance the lifting force from the spring with the downward forces from the center portion and wing frame portion such that the downward force on a skid plate of each portion on the ground varies automatically as the total downward force is varied.

The disclosures of both of the above are incorporated herein by reference.

Many headers have integrated transportation systems including wheels which can be deployed. However these are often limited in allowable speed and in many cases the design of the header precludes the provision of an integral transport system so that a trailer is a suitable alternative.

Several companies manufacture trailers to transport windrower and combine headers.

SUMMARY OF THE INVENTION

It is one object of the present invention to provide an apparatus for transporting the header with the tractor when separated from the front lift arms.

According to a first aspect of the invention there is provided an apparatus for transporting a header of a crop harvesting machine, the header having a header frame with a main support structure along a rear of the header and a plurality of arms extending forwardly from the main support structure to support a cutter bar at a front edge of the header, the apparatus comprising:

a longitudinal frame member for receiving the header carried thereon with the cutter bar on a first side of the frame member and the main support structure on a second side of the frame member;

a rear wheel assembly mounted on the frame member adjacent a rear end;

a front hitch assembly for connection of the frame member to a towing vehicle;

the frame member comprising a longitudinal beam with a plurality of transverse support arms attached thereto at spaced positions along the beam with the arms extending to the first side of the beam for engaging the header adjacent the cutter bar and extending to the second side of the beam for engaging the header adjacent the main support structure;

the longitudinal beam including a portion between a main portion of the beam and a front portion of the beam which portion extends to one side adjacent the front end of the beam so that a main portion of the longitudinal beam is offset to the first side relative to the front portion of the beam and the hitch assembly.

Preferably the hitch assembly is aligned with the rear wheel assembly along a center line and wherein the main portion of the beam is offset to the first side relative the center line.

Preferably there is provided a rear transverse beam attached to the rear end of the beam where the rear transverse beam is aligned with the center line and thus projects relative to the main portion of the beam to different lengths on the first and second sides.

Preferably the portion of the beam which extends to one side is inclined to both the main portion of the beam and to the front portion of the beam.

Preferably the front portion of the beam, the portion and the main portion of the beam lie in a common horizontal plane.

Preferably the rear wheel assembly is arranged such that it can be mounted at selected positions along the length of the frame member.

Preferably there is provided a steerable front wheel assembly attached at a forward end of the frame member and the hitch is attached to the steerable front wheel assembly for connection to the towing vehicle.

In the case where the towing vehicle is a swather tractor having a pair of header lift arms, there is preferably provided a yoke having two transversely spaced mounting members each for engaging a respective one of the lift arms of the swather tractor and a transverse connecting member extending between the mounting members and carrying a hitch for towing the longitudinal frame member and the header thereon.

In a transporter for smaller headers without the front wheel support, a forward end of the longitudinal frame member is attached to the yoke by a hitch coupling so as to be carried and towed by the yoke and so as to transfer load to the lift arms from the frame member.

In a transporter for larger headers there is provided a steerable front wheel assembly attached adjacent a forward end of the frame member with the hitch attached to the steerable front wheel assembly for connection to the towing vehicle and preferably the steerable front wheel assembly is attached to the yoke by a load transfer coupling which transfers down force to the yoke and therefore to the lift arms of the swather tractor from the front wheel assembly.

Preferably the load transfer coupling comprises a spring arrangement connected between the hitch assembly and the forward end of the frame structure such that down force is transferred by the spring arrangement to a forward end of the hitch assembly from the weight on the frame structure so as to transfer the weight to the yoke and therefore to the lift arms of the swather tractor.

According to a second aspect of the invention there is provided an apparatus for transporting a header of a crop harvesting machine, the header having a header frame with a main support structure along a rear of the header and a plurality of arms extending forwardly from the main support structure to support a cutter bar at a front edge of the header, the apparatus comprising:

a longitudinal frame member for receiving the header carried thereon with the cutter bar on a first side of the frame member and the main support structure on a second side of the frame member;

a rear wheel assembly mounted on the frame member adjacent a rear end;

a front hitch assembly for connection of the frame member to a towing vehicle;

wherein the towing vehicle is a swather tractor having a pair of header lift arms and wherein there is provided a yoke having two transversely spaced mounting members each for engaging a respective one of the lift arms of the swather tractor and a transverse connecting member extending between the mounting members and carrying a hitch for towing the longitudinal frame member and the header thereon.

According to a third aspect of the invention there is provided an apparatus for transporting a header of a crop harvesting machine, the header having a header frame with a main support structure along a rear of the header and a plurality of arms extending forwardly from the main support structure to support a cutter bar at a front edge of the header, the apparatus comprising:

a longitudinal frame member for receiving the header carried thereon with the cutter bar on a first side of the frame member and the main support structure on a second side of the frame member;

a rear wheel assembly mounted on the frame member adjacent a rear end;

a front hitch assembly for connection of the frame member to a towing vehicle;

wherein the towing vehicle is a swather tractor having a pair of header lift arms and wherein there is provided a yoke having two transversely spaced mounting members each for engaging a respective one of the lift arms of the swather tractor and a transverse connecting member extending between the mounting members and carrying a hitch for towing the longitudinal frame member and the header thereon;

wherein there is provided a steerable front wheel assembly attached at a forward end of the frame member and the hitch is attached to the steerable front wheel assembly for connection to the towing vehicle;

and wherein the steerable front wheel assembly is attached to the yoke by a load transfer coupling which transfers down force to the yoke and therefore to the lift arms of the swather tractor from the front wheel assembly.

The invention also includes the swather comprising:

a swather tractor having a frame, a pair of hydraulically driven ground drive wheels at a first end of the frame, a pair of castor wheels at a second end of the frame and a pair of header lift arms at the first end of the frame;

a header for mounting on the lift arms of the swather tractor having a header frame with a main support structure along a rear of the header with mountings for engaging the lift arms for supporting the header in a cutting action across a field to be harvested and a plurality of arms extending forwardly from the main support structure to support a cutter bar at a front edge of the header;

and a transport apparatus as defined above for transporting the header.

BRIEF DESCRIPTION OF THE DRAWINGS

Embodiments of the invention will now be described in conjunction with the accompanying drawings in which:

FIG. 2 is an isometric view of a first apparatus for transporting the header where the apparatus is arranged to support smaller size headers of a lower total weight, the apparatus being of the construction shown in FIG. 1.

FIG. 3 is an isometric view of a second apparatus for transporting the header where the apparatus is arranged to support larger size headers of a greater total weight and thus includes a front steerable wheel assembly.

FIG. 4 is a top plan view of the apparatus of FIG. 3 including the yoke for attachment to the tractor.

FIG. 6 is a side elevational view of the yoke and hitch of the apparatus of FIG. 4.

FIG. 7 is a side elevational view of the apparatus of FIG. 4.

In the drawings like characters of reference indicate corresponding parts in the different figures.

DETAILED DESCRIPTION OF A PREFERRED EMBODIMENT

Figure 1:
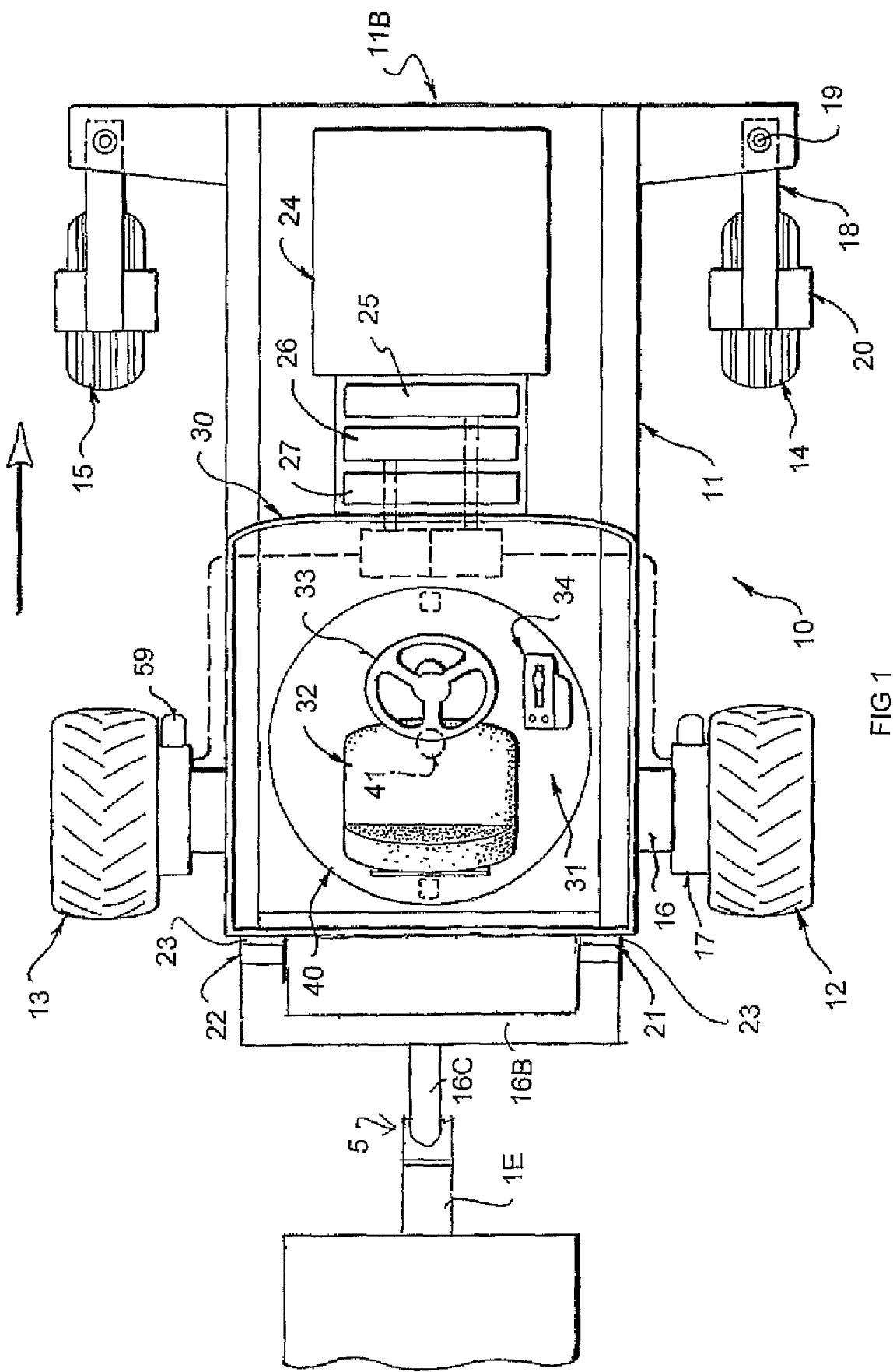
FIG. 1 is a top plan view showing a tractor including a transport apparatus according to the present invention attached to the tractor in the towing position of the tractor with the engine forward.
Figure 1A:
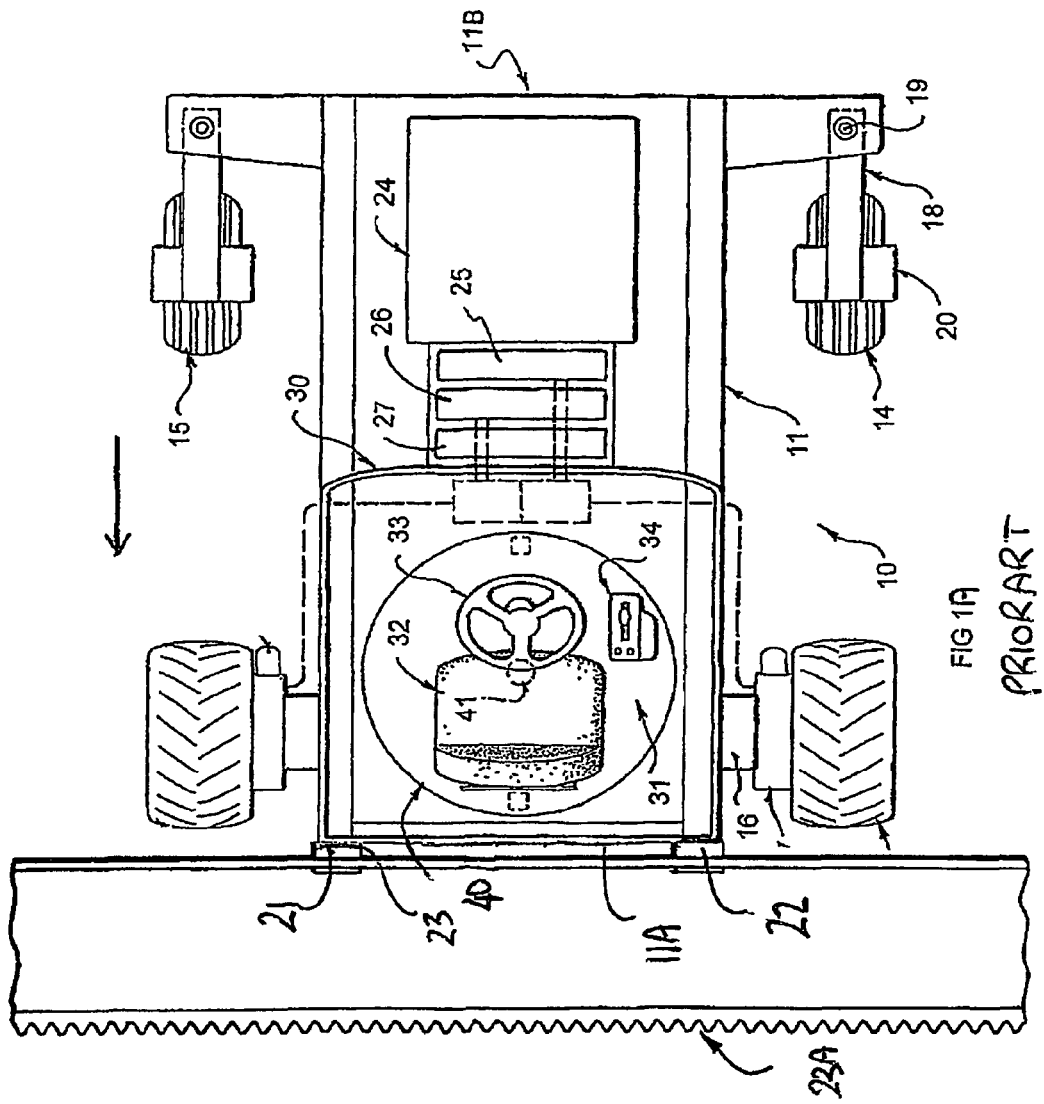
FIG. 1A is a top plan view taken from the above U.S. Pat. No. 7,159,687 showing the tractor including the header attached for operation in conventional manner.

A swather tractor generally indicated at 10, as shown in FIGS. 1 and 1A taken from the above patent includes a header 23A and includes a frame 11 which is carried on a first pair of driven ground wheels 12 and 13 and on a second pair of non-driven castor wheels 14 and 15. The driven wheels 12 and 13 are mounted on suitable supports 16 which support the ground wheels from the frame 11. The driven ground wheels 12 and 13 are each driven by a hydraulic motor 17 carried on the support 16 which receives hydraulic fluid under pressure from a supply line and drives the ground wheel at a rate of rotation dependant upon the rate of flow of the hydraulic fluid.

The wheels 14 and 15 are mounted on conventional castors 18 which swivel about a castor pin 19. The ground wheels 14 and 15 are non driven and are simply mounted in a supporting bracket 20 which can pivot around the castor pin 19 so that the castor wheels follow the movement of the vehicle as controlled by the driven wheels 12 and 13. Thus the speed of the vehicle over the ground is controlled by the rate of rotation of the wheels 12 and 13 and steering is controlled by a differential in speed between the wheels 12 and 13.

The frame is shown only schematically since this can vary widely in accordance with requirements as is well known to a person skilled in this art. At the first or driven end 11A of the frame is mounted suitable lift support arms 21 and 22 for carrying a header. Again these elements are well known to persons skilled in this art and various different designs can be used. Thus the support arms 21, 22 on the header carried thereby are shown only schematically. Various different types of headers can be used including disc type cutters or sickle knife cutters. The width of the header can vary considerably depending upon the type of crop and the cutting system employed. The header is preferably carried on the tractor rather than on separate supports and the tractor includes a lifting mechanism schematically indicated at 23 operable to raise and lower the header on the tractor between different working positions and between working positions and a raised position cleared from the ground for moving the header over the ground when not in working position.

The tractor includes an engine 24 carried on the frame 11 adjacent a second end 11B of the frame. The engine is arranged to drive a series of pumps 25, 26 and 27 for generating pressurized hydraulic fluid for driving the various components of the tractor as described hereinafter. Separate pumps can be used as shown or single pump can be used with the hydraulic fluid under pressure generated thereby being separated into separate controlled fluid paths for operating the various components.

At the first or driven end 11A of the frame is provided a cab 30 which sits over the driven end between the driven wheels 12 and 13 so the operator can look over the header during the operating action on the field. The cab 30 encloses an operator console generally indicated at 31 which includes a seat 32, a steering control 33 in the form of a conventional steering wheel, a speed control 34 and an accessory control 35. The steering wheel 33 is of a conventional nature and is mounted in the console in front of the seat by suitable mounting arrangements which allow the operator to enter the seat and be comfortably located on the seat behind the steering wheel. To the right hand of the operator is provided a speed control 34 generally in the form of a lever which can pivot forwardly and rearwardly between a reverse position at the rear, a neutral position at the center and a forward position at the front. In an intuitive manner, therefore, the operator can pull rearwardly on the lever for reverse and push forwardly on the lever for forward movement with the rate of the movement being controlled by the relative position of the lever along its sliding action. In addition there is provided a switch 34A which can be operated to select speed ranges for the driving speed of the vehicle.

In the arrangement shown in this application, the operator console 31 including the operator seat 32, the steering wheel 33, the speed control 34 and the accessory control 35 are all carried on a platform or base plate 40 carried by the cab on top of the frame 11. The base plate 40 can rotate on a support shaft 41 about a vertical axis 42 between a first position shown in FIG. 1 where the seat faces the first end 11A to the second position shown in FIGS. 2 and 3 in which the seat faces the second engine end 11B. These positions are known herein as "cab forward" in which the cab 30 is located at the forward end of the tractor as it moves with the end 11A at the front and "engine forward" in which the end 11B is at the front and moves forwardly.

The above arrangement is shown and described in the above U.S. Pat. No. 7,159,687.

In FIG. 2 is shown a plan view of the transport apparatus set up to transport a small header (25 ft) and to be pulled by a windrower tractor of the type described above.

The apparatus includes a main frame 1 formed as a single longitudinal beam 1A with rear wheels 2 which are arranged to be clamped on to the main frame at a required position. The rear wheels include two parallel axles 2A each mounting a pair of ground wheels 2B. The axles are clamped in place on the beam by bolts above an below the beam so that the position of the axles along the beam can be adjusted freely depending on the weight to be accommodated and the length of the beam. A header to be carried on the frame is supported when loaded on support arms extending transversely of the main beam 1A including pairs of cutter bar supports 3 and header leg supports 4 where both items of each pair are mounted on the frame 1 at common positions along the length of the frame, again at positions which can be adjusted to accommodate the length of the header to be mounted.

The main beam 1A is offset to the right of a center line at an inclined portion 1C to provide increased clearance for the frame structure. Thus the main longitudinal beam includes an angled 1C portion between a main portion 1D of the beam and a front portion 1E of the beam which portion 1C extends to one side adjacent the front end of the beam so that a main portion of the longitudinal beam is offset to the first side relative to the front portion of the beam and a hitch assembly 5. The hitch assembly 5 comprises a coupling 5A projecting forwardly from an end plate 5B which is attached directly at the front of the beam in line with the front portion of the beam. The coupling 5A thus is aligned with the rear wheel assembly along a center line so that the main portion of the beam is offset to the side of the beam, which carries the cutter bar, relative the center line. Thus the wheels 2B are symmetrically arranged on either side of the center line and the wheels on one side are closer to the main beam than on the other side. The portion 1C of the beam which extends to one side is inclined to the main portion of the beam and to the front portion of the beam with the front portion of the beam, the portion and the main portion of the beam all lying in a common horizontal plane.

At the rear of the beam is attached a transverse rear bar 1F which defines a rear of the trailer and is symmetrical relative to the center line and thus offset relative to the beam. It is clamped to main frame and may be telescoped out to position rear lights and a rearmost cutter bar support at position required for a specific header size.

In FIG. 3 is shown a construction similar to that of FIG. 2 with the differences that the apparatus is designed for longer heavier headers and hence has a longer main beam and more support arms 3, 4 for supporting the header. Some of the cutter bar supports 3 are mounted alone without corresponding supports 4 so as to hold the cutter bar against bouncing, bearing in mind its greater ability to move and flex.

Figure 5:
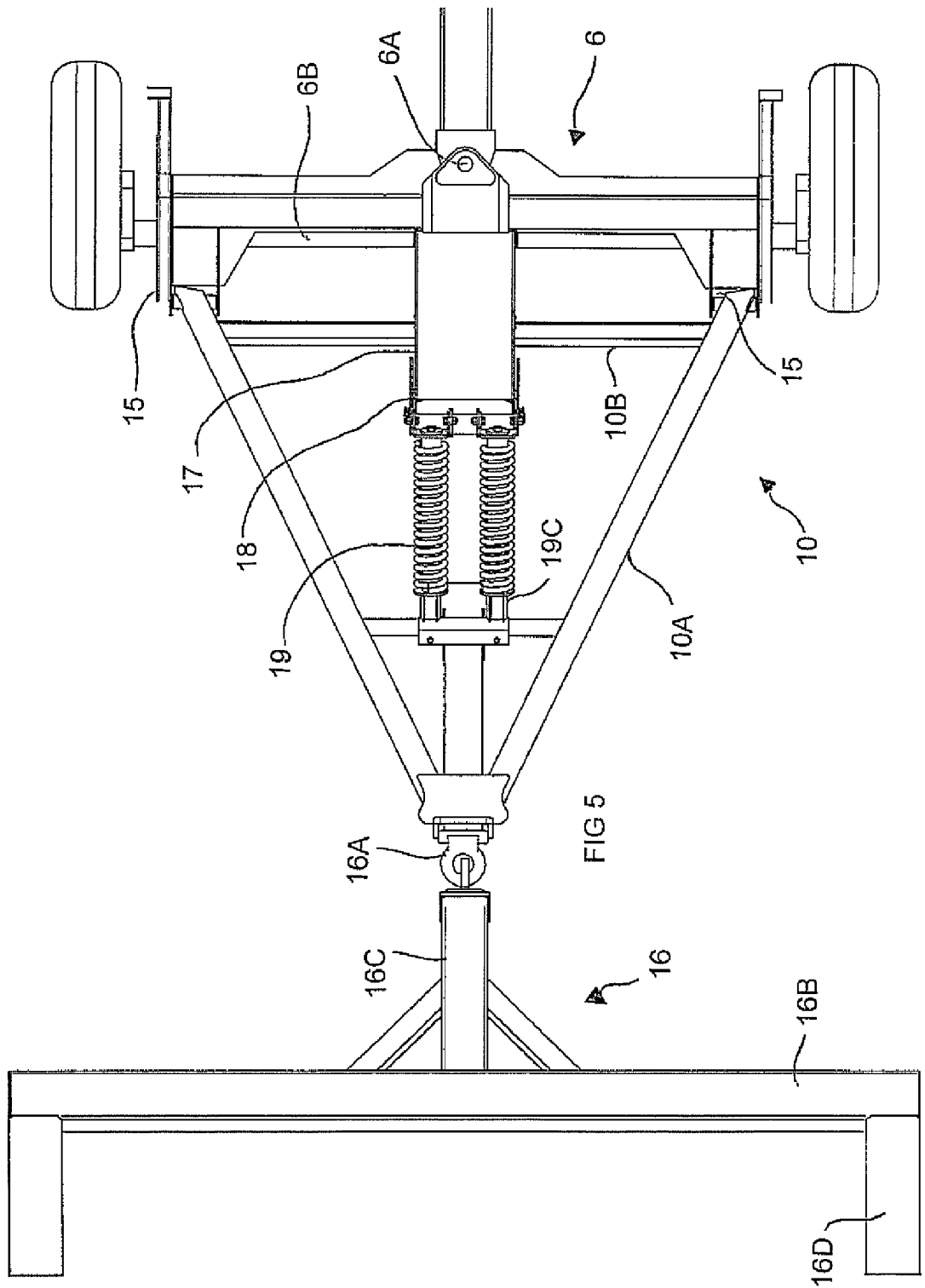
FIG. 5 is a plan view of the yoke and hitch of the apparatus of FIG. 4.

In addition in FIG. 4 and as shown in more detail in FIGS. 5 and 6 there is provided a front wheel assembly 6 mounted on a pivot pin 6A connecting main frame, that is the forward end of the beam 1A, to a front axle 6B. A hitch 10 defined by rearwardly and outwardly extending hitch arms 10A and a cross beam 10B is attached to the front wheels of the trailer at horizontal pivots 15. Attached to the front of the hitch 10 is a hitch coupling 14 which may be a ball receiver for a ball type hitch or a loop for a pin-type hitch as is used on many trailers, depending on weight to be pulled.

A yoke 16 is arranged for attachment of the trailer to the swather tractor with a standard hitch ball or hitch pin attached at 16A. The yoke comprises a transverse beam 16B with a trailing arm 16C extending rearwardly to the hitch and pockets or sleeves 16D and extending forwardly to the tractor for receiving the rearwardly extending tractor lift arms at 22 (FIG. 1). The pockets are designed and arranged such that they can be locked onto the tractor linkage when tractor is towing the trailer.

A weight transfer system is provided which acts to transfer weight from the frame and the header onto the hitch 16A so as to increase the amount of weight on the yoke 16 and therefore on the lift arms 22. This is provided to apply sufficient weight to the lift arms to balance the tractor.

The weight transfer system comprises a support 17 which is fixed to the front wheel support 6 so as to pivot with the front wheels about the vertical pivot axis 6A. A weight transfer spring 19, defined in the example by a pair of compression springs, is pivoted on a front end of the support 17 at a horizontal pivot 18 mount. These act to apply weight from the trailer on to the arms of the tractor as required for stable movement of the tractor.

The weight transfer spring support pivot mount 18 pivots at pin 18A on the support 17 through a range of motion determined by a slot 18C on the mount and a pin 18B on the support. Thus the hitch may be coupled directly to a coupling on the rear of a truck or a combine harvester and the slot 18C will allow the springs to have no affect for the normal range of motion when connected to a truck hitch. The pin 18C may also be removed if a larger range of motion is required.

The compression springs 19 are mounted on telescoping tubes 18C that are pivoted at 19A and 19B. The telescoping tubes have stops that limit how much the springs can extend.

In the position shown in FIG. 10 the mount 18 is pivoted forward until it bottomed on pin 18B. The compression spring 19 is extended until the telescoping guide tubes 19C have bottomed and the spring assembly acts as a tension link holding the trailer hitch 10 just off the ground. The yoke 16 has the hitch 16A held off the ground and the pockets 16B are resting on the ground G.

FIG. 7 shows the same trailer as FIG. 6 with a header loaded on the trailer and the yoke 16 and hitch 16A picked up by a tractor ready to tow. The hitch is raised so that the mount 18 is pivoted back until the pin 18B is bottomed on the other end of the slot 18C and the spring 19 is loaded in compression so that it transfers significant weight to the tractor linkage. The spring pivots are arranged so that as the hitch is raised further the moment arm for the spring is decreased to compensate for the increased spring force and keep the weight transfer approximately constant.

A pin is provided that can be removed to disengage the springs 19 when the weight transfer is not desired.

When the front axle is straight a portion of the load on the front wheels is transferred to the tractor linkage. A small portion is also transferred to the rear wheels.

When the front axle is turned close to 90 degrees then there is also a torque reaction that increases the load on the far rear wheels and decreases the load on the near rear wheels. If the far rear wheels are substantially lower than the near rear wheels and tractor then the tension link will contain the spring force and prevent the weight transfer from contributing to tipping the trailer.

The header is initially lowered onto the trailer a small distance to the right of the final location. The cutter-bar will first contact the supports 3. The supports are sloped about 30 degrees toward the centre of the trailer. When the header is fully lowered, the rear header supports contact the two supports that have a portion of the support horizontal and a portion sloped up about 45 degrees to front and rear. If the header is centered on the supports the header slides to the left of the trailer due to the 30 degrees slope on the cutter-bar supports until it is retained by a substantially vertical plate. If the header is not centered by a small distance it contacts the 45 degree portion of the supports and under the combined action of the 30 degree slope on the cutter-bar supports and the 45 degree slope on the rear supports it will slide into the desired transport position.

The windrower tractor can not lift the header high enough to easily clear trailer frame. The main support beam of the trailer frame must be deep enough to provide the necessary structural strength and the frame must be located high enough off of the ground to clear normal obstacles. When the windrower tractor raises the header the front of the header is raised more than the rear. Thus it is possible to obtain more clearance under the trailer frame by offsetting the frame to the right of the trailer which is at the front of the header, as previously described.

In order to provide one trailer that can provide transport for many different header sizes the following features are included:

The rear section of the frame telescopes out and is clamped in place to provide the frame length required for the various header sizes.

The rear wheels are clamped to the frame in a position required to not over load the wheels.

The rear wheels should mounted at a suitable position along the length of the beam to provide clearance to the windrower tractor wheel during loading and the header gauge wheel.

Tandem rear wheels 2 or single axle rear wheels may be clamped on depending on the weight of the header being transported.

The header support brackets 3, 4 may be clamped anywhere on the frame as required by the various header sizes and configurations.

The swather tractor that is used with these headers operates in the conventional manner when working in a field with the large drive wheels behind the header and castor wheels located behind the drive wheels. For transport, the header is removed and the direction of travel is reversed so the drive wheels are in the rear and the castor wheels are forward. In this configuration the swather tractor has a substantial load transferred to the drive wheel in order to have sufficient traction to operate. For the smaller sized headers this is accomplished by supporting the entire front of the trailer on the tractor as shown in FIG. 2.

The header described has a yoke attached to the front axle support that has pockets for the tractor lift linkage to engage in order to lift and tow the trailer. In order to provide clearance for the tractor to turn, this member pivots approximately six feet in front of the end of the header. This member is attached to the front axle support so that the front wheels will be steered in the direction of travel.

On large headers the trailer frame would be excessively long if the front wheels are extended six feet (required for turning clearance) in front of the header. Therefore the front wheels are mounted near the front of the header and a hitch structure is extended forward from the front wheels.

The arrangement described above can provide a trailer which is capable of:

transporting a header complete with combine adapter or hay conditioner over various field and road conditions.

carrying rigid headers sized 25, 30, 35, 40 and 45 ft.

carrying flex drapers sized 30, 35, 40 and 45 ft.

having the header quickly and easily loaded by a combine or by a windrower tractor.

being towed by a windrower tractor, combine or truck transferring about 2000 lbs load to windrower tractor drive wheels.

To provide a connection of the header to the frame, suitable latches and/or tie downs can be provided as will be apparent to one skilled in the art.

The invention claimed is:

1. Apparatus for transporting a header of a crop harvesting machine, the header having a header frame with a main support structure along a rear of the header and a plurality of arms extending forwardly from the main support structure to support a cutter bar at a front edge of the header, the apparatus comprising:

a longitudinal frame member for receiving the header carried thereon with the cutter bar on a first side of the frame member and the main support structure on a second side of the frame member;

a rear wheel assembly mounted on the frame member adjacent a rear end, the rear wheel assembly including at least two wheels arranged with a first of said at least two wheels on one side of the frame member and a second of the at least two wheels on an opposed side of the frame member;

a front hitch assembly for connection of the frame member to a towing vehicle;

the frame member comprising a longitudinal beam with a plurality of transverse support arms attached thereto at spaced positions along the beam with the arms extending to the first side of the beam for engaging the header adjacent the cutter bar and extending to the second side of the beam for engaging the header adjacent the main support structure;

the longitudinal beam including a main portion of the beam, an intermediate portion of the beam and a front portion of the beam;

the main portion of the beam forming a structural interconnection between the rear wheel assembly and the front hitch assembly and providing a support carrying the plurality of transverse support arms so as to transfer loads on the support arms from the header to the rear wheel assembly and the front hitch assembly;

the main portion of the beam being attached to the rear wheel assembly;

the intermediate portion being arranged so that it extends to one side adjacent the front end of the beam so that the main portion of the longitudinal beam is offset to the first side relative to the front portion of the beam and the hitch assembly;

wherein the hitch assembly is aligned with the rear wheel assembly along a center line;

and wherein the main portion of the beam is offset to the first side relative to the center line;

so that the main portion of the beam is offset to said one side relative to the hitch;

and so that the main portion of the beam is offset to said one side relative to the rear wheel assembly with a distance between the main portion of the beam and the first wheel being shorter than a distance between the main portion of the beam and the second wheel;

wherein there is provided a steerable front wheel assembly attached at a forward end of the frame member such that the weight of the header is carried on the longitudinal frame member and is transferred therefrom onto the rear wheel assembly and the steerable front wheel assembly;

a hitch attached to the steerable front wheel assembly for connection to the towing vehicle so that side to side movement of the hitch causes side to side steering movement of the front steerable wheels; and a load transfer spring coupling which receives load from the weight of the header carried on the longitudinal frame member and acts to transfer that load into a down force on the hitch which down force is applied to the towing vehicle.

2. The apparatus according to claim 1 wherein there is provided a rear transverse beam attached to the rear end of the beam where the rear transverse beam is aligned with the center line and thus projects relative to the main portion of the beam to different lengths on the first and second sides.

3. The apparatus according to claim 1 wherein the portion of the beam which extends to one side is inclined to the main portion of the beam and to the front portion of the beam.

4. The apparatus according to claim 1 wherein the front portion of the beam, the portion and the main portion of the beam lie in a common horizontal plane.

5. The apparatus according to claim 1 wherein the rear wheel assembly is arranged such that it can be mounted at selected positions along the length of the frame member.

6. The apparatus according to claim 1 wherein there is provided a steerable front wheel assembly attached at a forward end of the frame member and the hitch is attached to the steerable front wheel assembly for connection to the towing vehicle.

7. The apparatus according to claim 1 wherein the towing vehicle is a swather tractor having a pair of header lift arms and wherein there is provided a yoke having two transversely spaced mounting members each engaging a respective one of the lift arms of the swather tractor and a transverse connecting member extending between the mounting members and carrying a hitch for towing the longitudinal frame member and the header thereon.

8. A swather comprising:

a swather tractor having a frame, a pair of hydraulically driven ground drive wheels at a first end of the frame, a pair of castor wheels at a second end of the frame and a pair of header lift arms at the first end of the frame;

a header for mounting on the lift arms of the swather tractor having a header frame with a main support structure along a rear of the header with mountings for engaging the lift arms for supporting the header in a cutting action across a field to be harvested and a plurality of arms extending forwardly from the main support structure to support a cutter bar at a front edge of the header;

and a transport apparatus according to claim 1 for transporting the header.

9. Apparatus for towing by a towing vehicle and transporting a header, the header having a header frame with a main support structure along a rear of the header and a plurality of arms extending forwardly from the main support structure to support a cutter bar at a front edge of the header, the apparatus comprising:

a longitudinal frame member for receiving the header carried thereon with the cutter bar on a first side of the frame member and the main support structure on a second side of the frame member;

a rear wheel assembly mounted on the frame member adjacent a rear end;

a steerable front wheel assembly attached at a forward end of the frame member such that the weight of the header is carried on the longitudinal frame member and is transferred therefrom onto the rear wheel assembly and the steerable front wheel assembly;

a hitch attached to the steerable front wheel assembly for connection to the towing vehicle so that side to side movement of the hitch causes side to side steering movement of the front steerable wheels;

and a load transfer spring coupling which receives load from the weight of the header carried on the longitudinal frame member and acts to transfer that load into a down force on the hitch which down force is applied to the towing vehicle.

10. A swather comprising:

a swather tractor having a frame, a pair of hydraulically driven ground drive wheels at a first end of the frame, a pair of castor wheels at a second end of the frame and a pair of header lift arms at the first end of the frame;

the swather tractor being arranged such that it can be driven with the first end forward and for harvesting and with the first end rearward for towing;

a header for mounting on the lift arms of the swather tractor having a header frame with a main support structure along a rear of the header with mountings engaging the lift arms for supporting the header in a cutting action across a field to be harvested and a plurality of arms extending forwardly from the main support structure to support a cutter bar at a front edge of the header;

and a transport apparatus for transporting the header such that the header can be towed behind the tractor with the first end rearward;

the apparatus comprising:

a longitudinal frame member for receiving the header carried thereon with the cutter bar on a first side of the frame member and the main support structure on a second side of the frame member;

a rear wheel assembly mounted on the frame member adjacent a rear end;

a front hitch assembly for connection of the frame member to a towing vehicle;

and a yoke having two transversely spaced mounting members each engaging a respective one of the lift arms of the swather tractor and a transverse connecting member extending between the mounting members and carrying a hitch for towing the longitudinal frame member and the header thereon.

11. The swather according to claim 10 wherein the transport apparatus further comprises:

the rear wheel assembly including at least two wheels arranged with a first of said at least two wheels on one side of the frame member and a second of the at least two wheels on an opposed side of the frame member;

the frame member comprising a longitudinal beam with a plurality of transverse support arms attached thereto at spaced positions along the beam with the arms extending to the first side of the beam for engaging the header adjacent the cutter bar and extending to the second side of the beam for engaging the header adjacent the main support structure;

the longitudinal beam including a main portion of the beam, an intermediate portion of the beam and a front portion of the beam;

the main portion of the beam forming a structural interconnection between the rear wheel assembly and the front hitch assembly and providing a support carrying the plurality of transverse support arms so as to transfer loads on the support arms from the header to the rear wheel assembly and the front hitch assembly;

the main portion of the beam being attached to the rear wheel assembly;

the intermediate portion being arranged so that it extends to one side adjacent the front end of the beam so that the main portion of the longitudinal beam is offset to the first side relative to the front portion of the beam and the hitch assembly;

wherein the hitch assembly is aligned with the rear wheel assembly along a center line;

and wherein the main portion of the beam is offset to the first side relative the center line;

so that the main portion of the beam is offset to said one side relative to the hitch;

and so that the main portion of the beam is offset to said one side relative to the rear wheel assembly with a distance between the main portion of the beam and the first wheel being shorter than a distance between the main portion of the beam and the second wheel.

12. A swather comprising:

a swather tractor having a frame, a pair of hydraulically driven ground drive wheels at a first end of the frame, a pair of castor wheels at a second end of the frame and a pair of header lift arms at the first end of the frame;

the swather tractor being arranged such that it can be driven with the first end forward and for harvesting and with the first end rearward for towing;

a header for mounting on the lift arms of the swather tractor having a header frame with a main support structure along a rear of the header with mountings engaging the lift arms for supporting the header in a cutting action across a field to be harvested and a plurality of arms extending forwardly from the main support structure to support a cutter bar at a front edge of the header;

and a transport apparatus for transporting the header such that the header can be towed behind the tractor with the first end rearward, the apparatus comprising:

a yoke having two transversely spaced mounting members each engaging a respective one of the lift arms of the swather tractor and a transverse connecting member extending between the mounting members and carrying a hitch;

a longitudinal frame member for receiving the header carried thereon with the cutter bar on a first side of the frame member and the main support structure on a second side of the frame member;

a rear wheel assembly mounted on the frame member adjacent a rear end;

a steerable front wheel assembly attached at a forward end of the frame member such that the weight of the header is carried on the longitudinal frame member and is transferred therefrom onto the rear wheel assembly and the steerable front wheel assembly;

a hitch coupling attached to the steerable front wheel assembly for connection to the hitch of the yoke so that side to side movement of the hitch coupling causes side to side steering movement of the front steerable wheels;

and a load transfer spring coupling which receives load from the weight of the header carried on the longitudinal frame member and acts to transfer that load into a down force on the hitch coupling which down force is applied to the yoke and therefore to the lift arms of the swather tractor from the front wheel assembly.

* * * * *